United States Patent [19]

Hikita

[11] Patent Number: 4,646,767
[45] Date of Patent: Mar. 3, 1987

[54] COIN COUNTER

[75] Inventor: Michiyasu Hikita, Kusatsu, Japan

[73] Assignee: Kabushiki Kaisha Ishida Koki Seisakusho, Kyoto, Japan

[21] Appl. No.: 395,866

[22] Filed: Jul. 7, 1982

[30] Foreign Application Priority Data

Apr. 2, 1982 [JP] Japan .................................. 57-54945

[51] Int. Cl.⁴ ............................................ G07D 9/04
[52] U.S. Cl. ...................................... 133/8 R; 177/50; 177/200
[58] Field of Search .............. 133/1 R, 1 A, 8 R, 8 A; 177/50, 200; 377/7, 22; 53/501, 502

[56] References Cited

U.S. PATENT DOCUMENTS 4,247,019  1/1981  Lerner ........................... 133/8 R X
4,375,243  3/1983  Doll ................................ 177/200 X

FOREIGN PATENT DOCUMENTS 57-64121   4/1982  Japan ................................. 177/200
2076979   12/1981 United Kingdom ................ 177/200

Primary Examiner—F. J. Bartuska
Attorney, Agent, or Firm—Lowe Price LeBlanc Becker & Shur

[57] ABSTRACT

This invention relates to a coin counter, and more particularly to a coin counter using a weighing scale to count and display the total sum of coins and to print out the sum at need, the counter also being capable of checking whether or not the total sum of coins placed on the weighing scale is included within a range between preset upper and lower limits.

12 Claims, 11 Drawing Figures

COIN COUNTER

DESCRIPTION OF THE PRIOR ARTS

A conventional coin counter is used in a bank or a casino where large amounts of coins are handled, which has adopted a means such that coins dropping from a hopper are detected one by one by use of, for example, a photosensor, thereby being defective in taking much time to count the total number of coins. Another means is to use a counting scale by which the total weight of coins is divided by unit weight so that the number of coins is countable, but several kinds of coins are put in circulation in one country, whereby the unit weight has to be reset corresponding to the kind of coin each time the coins are counted, which has been very troublesome for clerks concerned.

Furthermore, the above two means can count the total number of coins, but not the total sum, thus occasionally causing an error therein.

SUMMARY OF THE INVENTION

This invention is characterized mainly in that; unit weight data and unit value data of various coins are previously stored in a memory and keys are operated to count the total sum of coins placed on a weighing scale, from the unit weight and unit value data fetched and the weight data given from the weighing scale, thereby displaying the counting result by a display unit and/or a printer; and a check mechanism is provided to make it possible to audibly or visually judge whether or not the counting result is included within the predetermined range. An object of the invention is to provide a coin counter which can count and display the total sum of coins but not the total number thereof. Another object of the invention is to provide a coin counter which can audibly or visually judge whether or not the total sum of coins is included in the preestimated range. A further object of the invention is to provide a coin counter which uses a coin-only key when few kinds of coins are to be counted, while, ten-keys and a coin set key when many kinds of coins are to be counted, so that the kinds of coins to be counted can be set. A still further object of the invention is to provide a coin counter which can print out the grand total and the sub-total at need.

These and other objects of the invention will become more apparent in the detailed description and examples which follow.

DETAILED DESCRIPTION OF THE INVENTION

Figure 1:
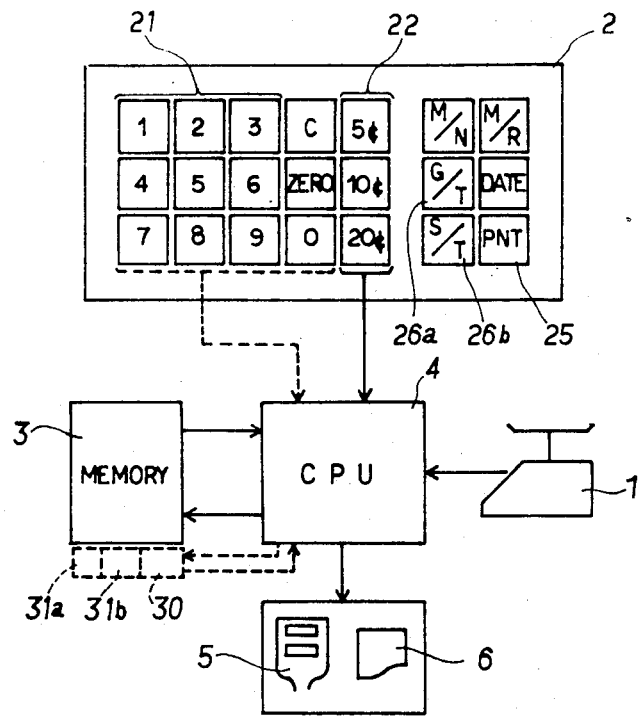
FIG. 1-(a) is a schematic block diagram of an embodiment of a coin counter of the invention, FIG. 1-(b) is a view of a modified embodiment of the invention, which is different in a keyboard from the FIG. 1-(a) embodiment.
Figure 1:
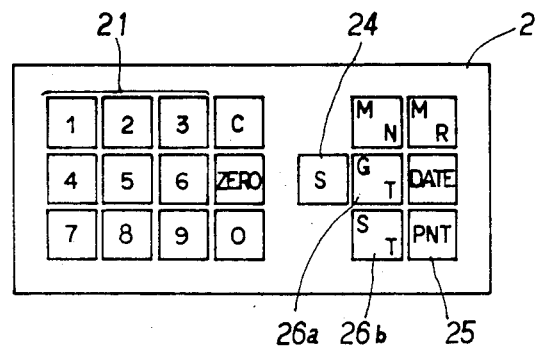

FIG. 1-(a) is a block diagram showing an outline of this invention, in which a weighing scale 1 is a usual electronic scale using a sensor, such as load cells. On a keyboard 2 are provided keys each capable of setting a particular coin among many coins, which are keys only for coins 22, such as a 5 cent key, 10 cent key and 20 cent key, corresponding to various kinds of coins as shown in FIG. 1. A coin setting key 21 as well as the ten-keys, as shown in FIG. 1-(b), are provided so that, for example, when one cent is intended to be set, a "1" key is pushed and a "s" key: coin setting key 24, is pushed. When a ten cent coin value is intended to be set, the keys are adapted to be pushed in the order of "1"→"0"→"S", and when a one dollar coin value is intended to be set, the keys are pushed in the order of "1"→"0"→"0"→"S". In FIGS. 1-(a) and -(b), a key "C" is a clear key for clearing an input value or a displayed value, a key "zero" being used for the zero adjustment of weighing scale. In FIG. 1-(a), a key "DATE" is used for the date input and a key "M/N" for the machine number input. Three keys 25, 26a and 26b, for actuating a printer 6 are to be discussed below.

A memory 3 stores data as to unit weights and unit values of various coins. When a read only memory (ROM) is used as memory 3, the data as to the unit weight and unit value cannot be readily changed, but when a random access memory (RAM) is used, the ten-keys 21 can be used to easily change the data to thereby cope with a case that each country is different in the currency, or the currency varies in weight and kind. A display unit 5 and a printer 6 are used to display or record the result of operation by the central processing unit to be discussed below.

Figures 2, 5:
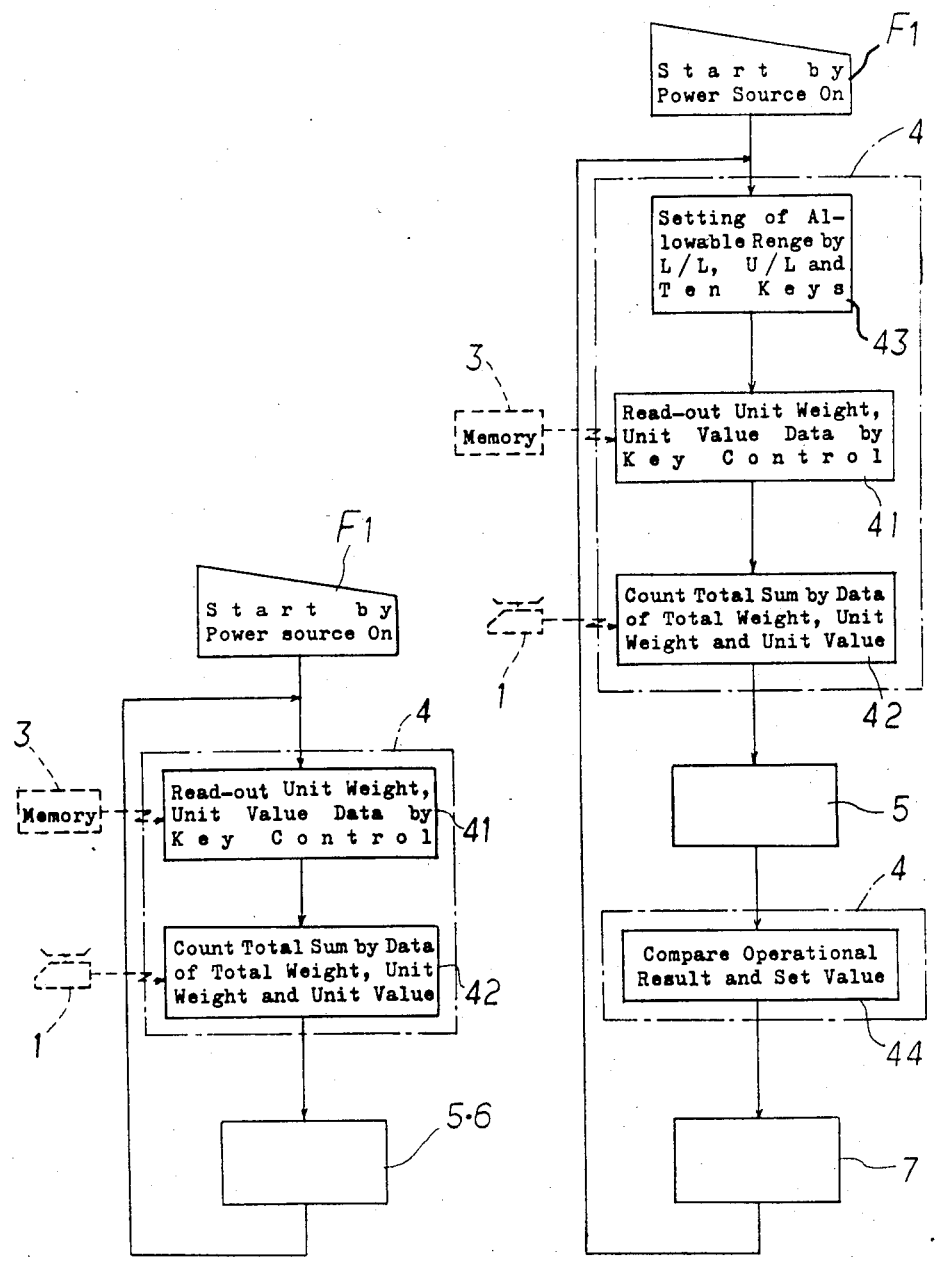
FIG. 2 is a schematic flow chart of a central processing unit in FIG. 1.
FIG. 5 is a flow chart showing an outline of operation of the central processing unit in FIG. 4.

The central processing unit 4 incorporates therein a read means (41) and an arithmetic means 42, which are programmed as shown in FIG. 2 flow chart. In FIG. 2, at first, (i) the power source is turned on to start the program (F1) and then (ii) a desired one coin key 22 is pushed corresponding to the coins to be placed on weighing scale 1, or the tenkeys 21 and coin setting key 24 are used to set the kind of coins to be counted, whereby read means 41 is actuated to fetch from the memory 3 the unit weight data and the unit value data (for example, the value of one cent for a one cent coin), and (iii) in this condition, when the coins are placed on weighing scale 1, arithmetic means 42 is actuated so that the central processing unit 4 calculates the following Total sum = (Total weight/Unit weight) × Unit value Thus, the total sum of coins placed on weighing scale 1 is calculated to thereby give the data to the display unit 5 and/or printer 6.

The use of the scale means constructed as foregoing can count a large amount of coins at one stroke at the place, such as a bank or casino, where a large number of coins are handled. The result of counting is displayed and checked by display unit 5, at which time a print key 25 is pushed to allow printer 6 to print out the result. The printer 6 of course can print out the weighing result registered in a regiseter 30 by pushing print key 25 at every weighing. Alternatively, the result from each weighing may be sequentially added to be registered at registers 31a, 31b, so that a grand total key 26a may be pushed to read out the grand total for every fixed time period, e.g., every day, from register 31a to thereby print out it. Or, a sub-total key 26b may be pushed every time period, e.g., every hour, at an interval between the operations of grand total key 26a, whereby the sub-total for said time period may be read out of register 31b and printed out.

Figure 3:
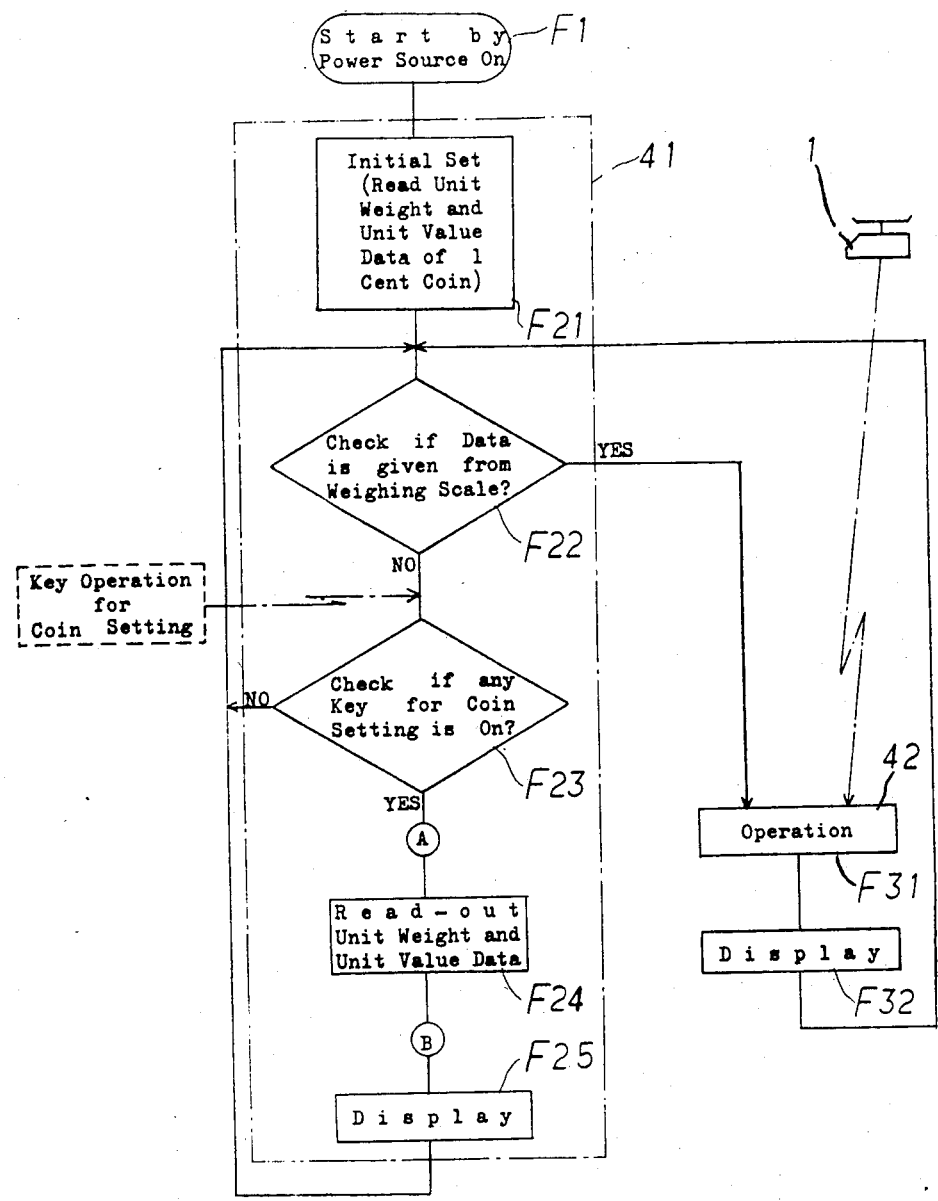
FIG. 3 is a flow chart of an embodiment of the invention, the FIG. 2 flow chart in detail, FIG. 4-(a) is a schematic block diagram of the coin counter of the invention, which can audibly or visually check the total sum of coins, FIG. 4-(b) is a view of another modified embodiment different in a keyboard from FIG. 4-(a), FIG. 4-(c) is a view of a further modified embodiment different in the keyboard from FIGS. 4-(a) and -(b)

FIG. 3 is a flow chart of the embodiment of the coin counter of the invention when cent coins are to be counted, which represents the FIG. 2 flow chart in detail.

In FIG. 3, a power source is turned on (F1) to start the program. In order to actuate read means 41, a desired one coin key 22, as a rule, is pushed, or ten-key 21 and coin setting key 24 are used as shown in FIG. 2, but the read means 41 at the FIG. 3 embodiment, upon turning on the power source, is actuated automatically in the same condition as unconditionally pushing the coin key 22 of high frequency in use, e.g., one cent key. In other words, display unit 5 displays "one cent" and the unit weight and unit value of one cent coin are read from memory 3 and given to an arithmetic unit 42 (F21). Next, it is checked whether or not data is given from weighing scale 1 (F22). If not, a particular coin key 22 (where the one cent key is exclusive) is pushed (F23, YES) to thereby read information regarding coins of desired kinds and give it into central processing unit 4 for operation (F24), and then the display unit 5 displays, for example, "5 cent" (F25).

Upon placing the same kind of coins on weighing scale 1 after a finish of the aforesaid read step, the data from weighing scale 1 and memory 3 are used to actuate arithmetic unit 42 to count up the total sum of coins (F31), the result from which is displayed on display unit 5 (F32) and printed out by printer 6 at need.

Subsequently, when different kinds of coins are intended to be counted of the total sum, the previously counted coins are unloaded from weighing apparatus 1 and the coin key 22 or the ten-key 21 and coin setting key 24, are used to set the kinds of coins next to be counted (F23) (where the one cent key is inclusive) and then the coins to be counted are placed on weighing scale 1.

The aforesaid coin counter is convenient for use when the total sum of coins to be counted is previously unknown. However, in a case that this kind of counter is used, for example, in a bank, the bank may be desirous of checking the total sum which a customer shows orally or with a memo, because he is acquainted of the total sum prior to putting the coins in the bank at the counter thereof. Such a check will be very simplified by use of a coin counter constructed as shown in FIG. 4 and below.

Figure 4:
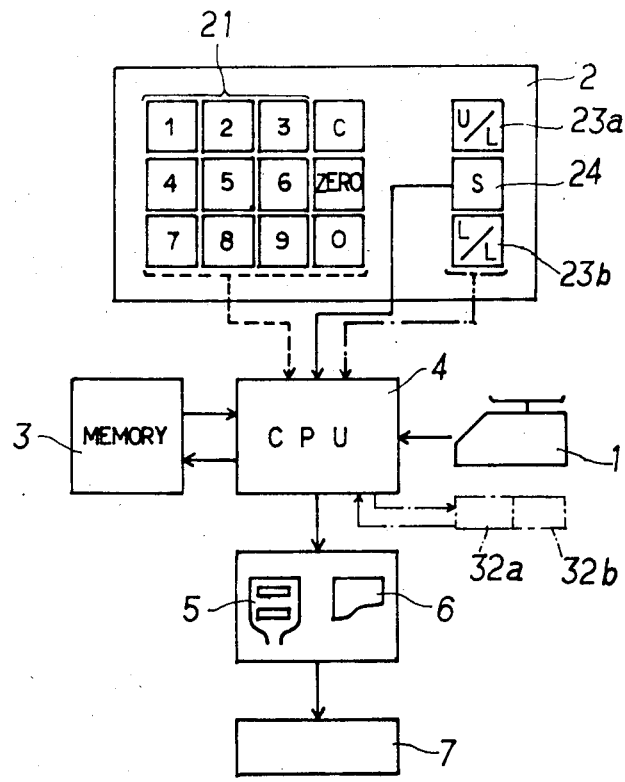
Figure 4:
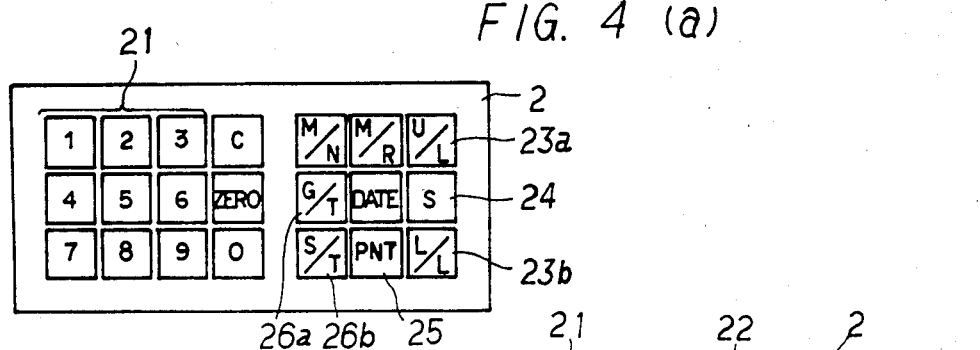
Figure 4:
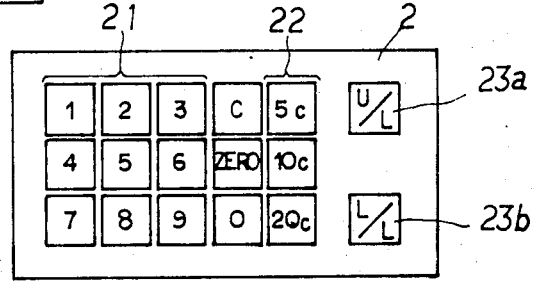
Figure 6:
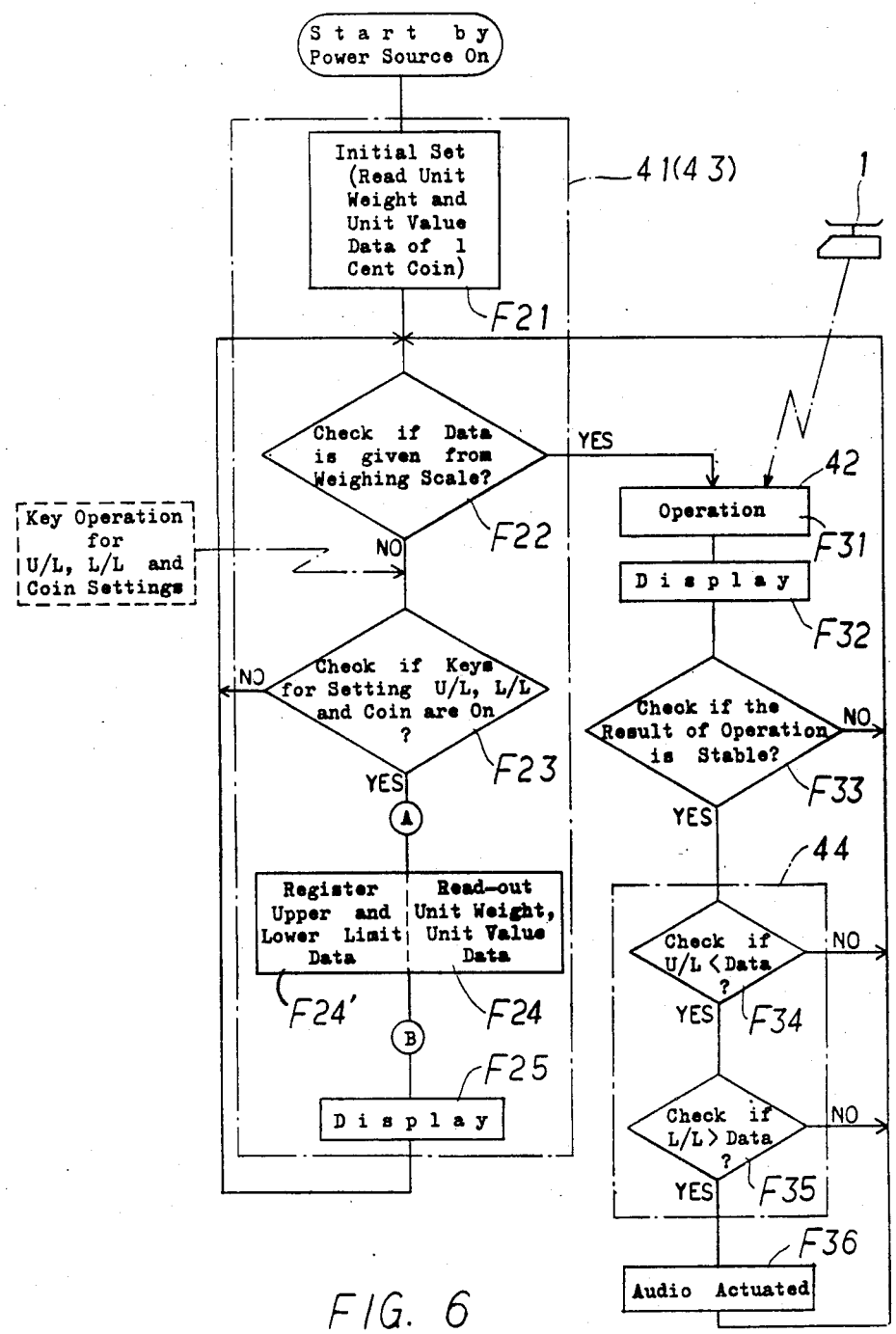
FIG. 6 shows the FIG. 5 flow chart in detail.

Now, the keyboard 2, as shown in FIGS. 4-(a), -(b) and -(c), provides an upper limit key 23a and a lower limit key 23b, and the central processing unit 4, as shown in FIG. 5, provides a range setting means 43 capable of setting the total sum allowance range by use of the upper and lower limit setting keys 23a and 23b and ten-keys 21, so that the ten-keys 21 and upper limit setting key 23a are pushed in the order of from the former keys 21 to the latter key 23a or vice versa to thereby set the allowable upper limit at memory 3 or a separate register 32a, and the ten-keys 21 and lower limit setting key 23b are pushed in the order of from the former keys 21 to the latter 23b or vice versa to thereby set the allowable lower limit at memory 3 or a separate register 32b (F24') (refer to FIG. 6). Furthermore, CPU4 is provided with a comparison means 44 which compares the result of operation by arithmetic unit 42 with the upper and lower limits, the output of comparison means 44 being given to a check unit 7 which can audibly or visually check the compared result when included within the setting range. For example, an acoustic device, such as a buzzer, can be used as the audible check unit and a luminous element, such as a light-emitting diode, as the visual check unit. In addition, the embodiments in FIGS. 4-(a) and -(b) can set coins to be counted, by sequentially pushing ten-keys 21 and coin setting key 24, and that in FIG. 4-(c) has the key 22 only for coins.

As seen from the above, the coin counter constructed as foregoing enables an operator to check the total sum of coins audibly or visually without locking at display unit 5.

FIG. 6 shows a modified embodiment of the invention, which counts cent coins the same as in FIG. 3 and shows the FIG. 5 flow chart in detail. Next, explanation will be given only of the counting steps different from those in FIG. 3.

At first, it is necessary to actuate the allowable range setting means 43 and the power source is on to start the program and thereafter the upper limit key, lower limit key, and ten-keys, are used to set the upper and lower limits of the allowable total sum in memory 3 (F'24).

The comparison means 44, after judging whether or not the result of operation is stable, in other words, weighing scale 1 is stable (F33), compares the result the operation with the maximum upper limit value and minimum lower limit value (F34, F35), thereby actuating check unit 7 when the result is included between both the values.

Incidentally, in the embodiments in FIGS. 5 and 6, the result of operation is only displayed in display unit 5 but not recorded in printer 6, in which the keyboard 2 shown in FIG. 4(b) alternatively may of course be used to actuate printer 6. Furthermore, a mode of no check unit as shown in FIG. 3 and that of adding the check unit as shown in FIG. 6, can be combined to propose various embodiments. For example, a read-only-memory to practice the invention incorporating read means 41 and arithmetic means 42 in the program as shown in FIG. 3 and a read-only-memory to practice the invention incorporating range setting means 43 and comparison means 44 in the above two means as the program, have been prepared, and within the coin counter body have been provided the weighing scale 1, memory 3, display and/or printer, and check unit, so that the two ROMs are exchanged, thereby making it possible to select a coin counter of either mode.

Figure 7:
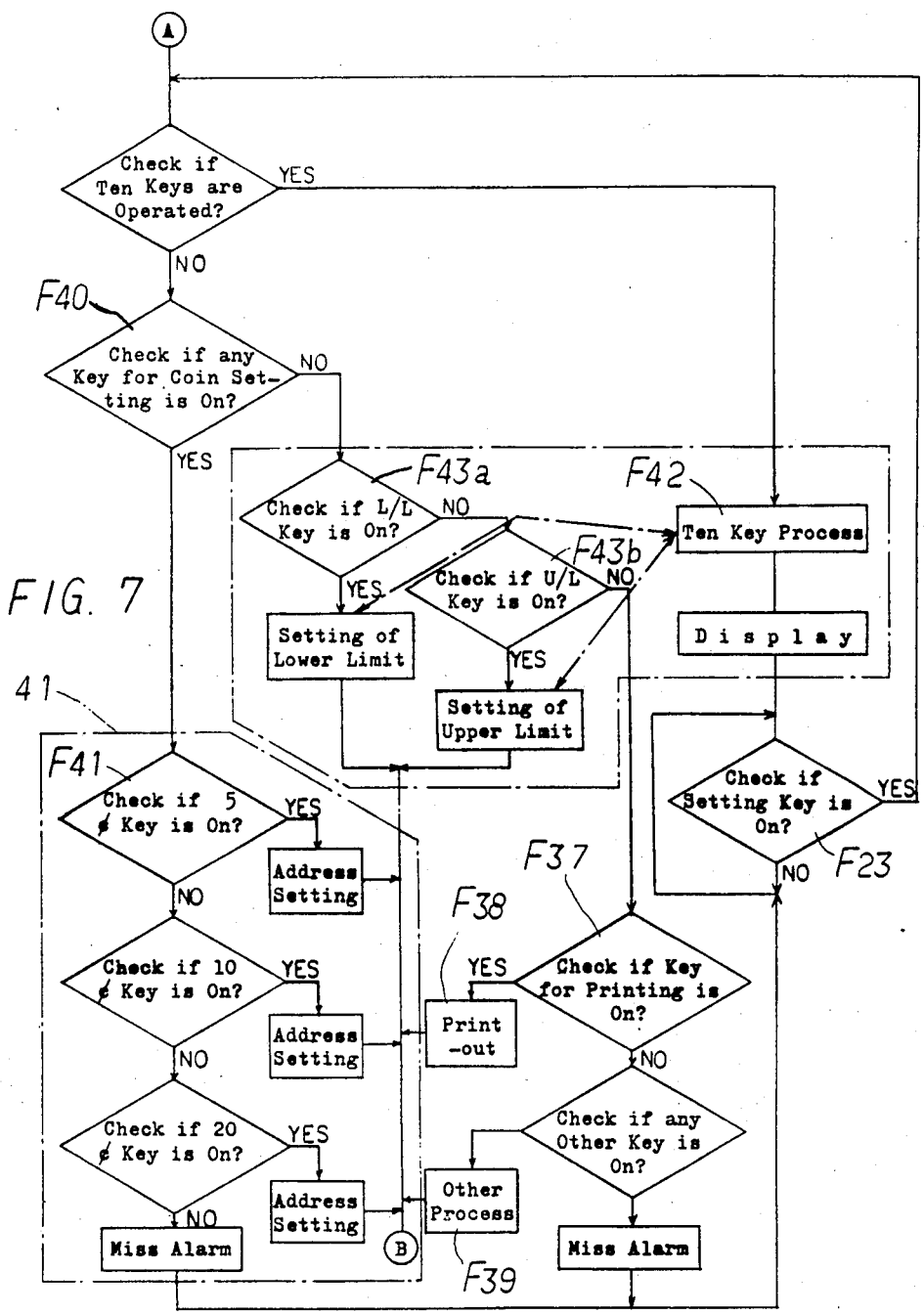
FIG. 7 is a flow chart explanatory of key operations in detail.

FIG. 7 is a flow chart of the key operation in a case of actuating the read means 41, range setting means 43 and printer 6. In read means 41, a desired one coin key 22 is on (F40, YES), whereby the address of memory 3 storing the data for the corresponding coin is set (F41), and the data of unit weight and unit value stored in said access can be read out. The range setting means 43, during the setting of upper and lower limit values, operates ten-keys (F42), and before or after the ten-key operation (after, in the FIG. 7 flow chart), the upper and lower limit setting keys 23a and 23b are pushed (F43a, F43b), which is a characteristic of the invention. Furthermore, a print key 25 corresponds to the register 30 which registers the result of operation by arithmetic unit 42, a grand total key 26a to the register 31a, and a sub-total key 26b to the register 31b. Thus, one of three keys 25, 26a and 26b, is pushed (F37) to read out the content of the corresponding one of three registers 30, 31a and 31b, thereby being printed out (F38).

Also, a "M/N" key and ten-keys 21 on keyboard 2, are used to enable the registration of machine number, and a "DATE" key and ten-keys 21, are also used to enable the registration of the date (F39).

Alternatively, the hardware equivalent in function to the central processing unit 4 may of course be substituted for read means 41, arithmetic means 42 and comparison means 43.

Figure 8:
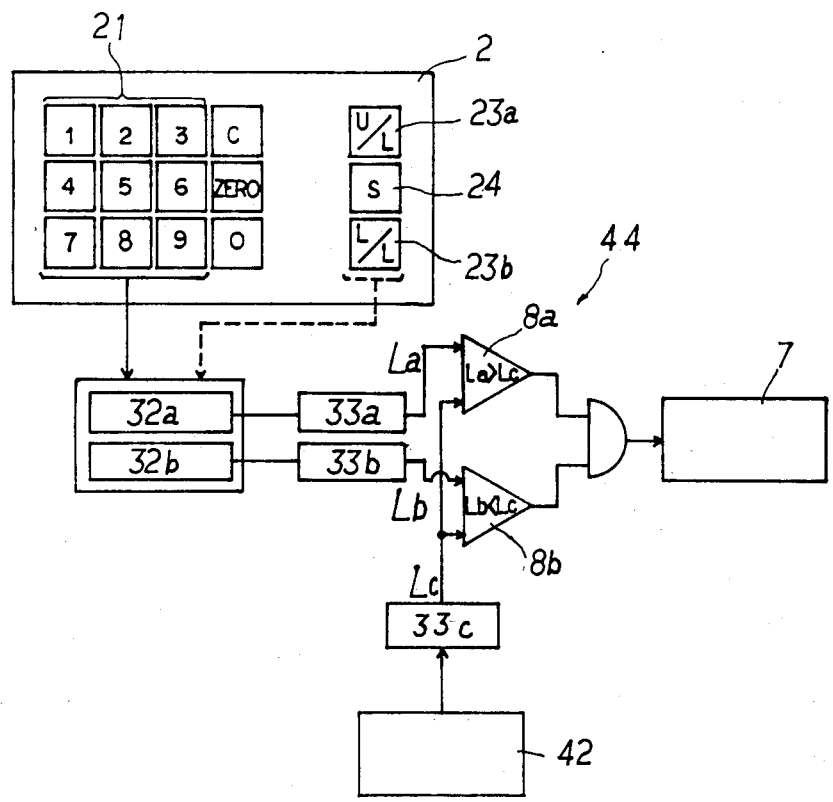
FIG. 8 is a view exemplary of hardware applied to the practice of the invention.

FIG. 8 shows the hardware for actuating check unit 7 by use of a comparison means 44. At first, the upper limit value and lower limit value La and Lb given by use of ten-keys 21 and upper and lower limit setting keys 23a and 23b are registered in the upper limit register 32a and lower limit register 32b, and when the output of the scale is stabilized, the contents of the two registers 32a and 32b and the result of operation by arithmetic means 42 are shifted to comparison registers 33a, 33b, and 33c respectively, and then two comparators 8a and 8b for comparing the upper and lower limits are adapted to check La>Lc and Lb<Lc to thereby actuate the check unit.

As seen from the above, the coin counter of the invention is adapted to previously store the unit weight and unit value of the coin in the memory to thereby display or record the grand total sum of coins placed on the weighing scale, whereby the total sum of coins can be seen in an extremely short time and also it is not so troublesome to count up the total sum at every fixed time period. Furthermore, the coin counter can audibly show whether or not the total sum of coins is included in the preestimated range, thereby being advantageous in that the counting work is performable without observing the display unit.

Although the invention has been described with reference to several different embodiments, these embodiments are merely exemplary and not limiting of the invention which is defined solely by the appended claims.

What is claimed is:

1. A coin counter characterized in being provided with;
   a weighing scale means for weighing coins and providing weight data;
   a memory means for storing therein unit weight data and unit value data for a plurality of coin denominations;
   a range setting means comprising a ten key pad, means for setting an upper limit and means for setting a lower limit for storing a range of a preestimated total sum in said memory means;
   a read means for reading out said unit weight data and unit value data corresponding to one of said plurality of coin denominations from said memory means, comprising selecting means for selecting data corresponding to one of said plurality of coin denominations;
   an arithmetic means for counting a total value of said coins from the weight data given from said weighing scale means and the unit weight data and unit value data given from said memory means;
   a display means for displaying the result of said count;
   a comparison means for comparing said result with said preestimated total sum range; and
   a check means for displaying the result from said comparison.

2. A coin counter as recited in claim 1 wherein said selecting means comprises pushbutton key means including a plurality of dedicated single key means each operable for identifying a selected coin denomination and for accessing unit weight data and unit value data pertaining thereto from said memory means.

3. A coin counter as recited in claim 2 wherein said pushbutton key means further comprises ten digit key means of a keypad operable for jointly identifying a selected coin denomination and a coin setting key means for jointly identifying a selected coin denomination, jointly selected by said key means of said keypad, and for accessing unit weight data and unit value data pertaining thereto from said memory means.

4. A coin counter as recited in claim 1 wherein said memory comprises separate register means for storing said upper and lower limits of the preestimated total sum.

5. A coin counter characterized in that said counter is provided with;
   a weighing apparatus for weighing coins and providing weight data;
   a memory therein unit weight data and unit value data for a plurality of coin denominations;
   a read means for reading out said unit weight data and unit value data of corresponding to one of said plurality of coin denominations from said memory means, comprising selecting means for selecting data corresponding to one of said plurality of coin denominations;
   a first control means comprising an arithmetic means for counting a total value of said coins from the weight data given from said weighing scale means and the unit weight data and unit value data given from said memory means.
   a second control means comprising a range setting means comprising a ten key pad, means for setting an upper limit and means for setting a lower limit for storing a preestimated total sum range in said memory means, and comparison means for comparing the upper and lower limits set by said upper and lower setting means with the total sum;
   a display means for displaying the results of said count by said first control means and the range set by said second control means; and
   a check means for displaying the result of the comparison by said comparison means.

6. A coin counter according to claim 5, wherein said first and second control means are assembled as programs in separate ROMs respectively so that each of said ROMs is adapted to be exchangeable to select either one of said first and second control means for incorporation in said counter.

7. A coin counter according to claim 5 wherein said first control means comprises said read means and the arithmetic means and wherein said second control means comprises the arithmetic means and the read means together with the range setting means and the comparison means, and wherein said first and second control means are assembled in separate interchangeable read only memories in order to interchangeably select either one of the first and second control means for connection in the counter.

8. In a coin counter having a weighing scale means, a control means connected thereto including a memory means, an input means connected to provide data to said memory means, arithmetic means connected to perform arithmetic functions on data from said weighing scale means and on data from said memory means to determine a value of coins weighed by said weighing scale means, and an output means connected to provide outputs from said control means representing results of arithmetic functions performed by said arithmetic means, the improvement comprising:

means for storing in said memory means unit weight and unit value data corresponding to a plurality of different denomination coins, means for accessing data corresponding to a preselected coin denomination on power up of the counter thereby initializing the counter to count coins of said preselected denomination, select means for selecting data corresponding to a different coin denomination thereby setting the counter to count coins of said different denomination, said select means comprising a plurality of individual setting means, each corresponding to a different respective coin denomination and connected to said control means, each of said individual setting means operable for accessing from said memory means unit weight and value data corresponding to a specified one of the coin denominations, said select means further comprising a plurality of joint setting means and a setting control means, a number of said joint setting means jointly operable for identifying a specified coin denomination, said setting control means operable for accessing from said memory means unit weight and value data corresponding to a specified coin denomination identified by the number of said joint setting means thereby to set the counter to count coins of said specified coin denomination, and further including means for verifying a value of a plurality of coins, comprising:

range setting means for setting an arbitrary range of values for the coins weighed by said weighing scale means;

comparing means for comparing the value of the coins weighed by said weighing scale means and the arbitrary range of values, and alarm means responsive to said comparison for indicating whether the value of the weighed coins is within or without the arbitrary range.

9. An improved coin counter as recited in claim 8 wherein said range setting means comprises:

first means forming part of said input means for setting an upper limit to a memory storage;

second means forming part of said input means for setting a lower limit to a memory storage;

said comparing means comprising means connected to said memory storage for comparing the value of the weighed coins with said upper and lower limits and for providing an output signal to said alarm means.

10. An improved coin counter as recited in claim 8 wherein an alarm provides an audible indication of whether the value of the coins is within or without the arbitrary range, whereby a user's full concentration may be directed to the task of determining the value of a preestimate plurality of coins.

11. A coin counter characterized in being provided with:

a weighing scale means for weighing coins and providing weight data;

a memory means for storing therein unit weight data and unit value data for a plurality of coin denominations;

a range setting means comprising a ten key pad, means for setting an upper limit and means for setting a lower limit for storing a range of a preestimated total sum in said memory means;

a read means for reading out said unit weight data and unit value data corresponding to one of said plurality of coin denominations from said memory means, comprising selecting means for selecting data corresponding to one of said plurality of coin denominations;

said selecting means comprising pushbutton key means including a plurality of dedicated single key means each operable for respectively identifying a selected coin denomination and for respectively accessing unit weight data and unit value data pertaining to said selected denomination from said memory means;

wherein said pushbutton key means further comprises ten digit key means of a keyboard operable for jointly identifying a selected coin denomination and a coin setting key means for jointly identifying a selected coin denomination, jointly selected by said key means of said keypad, and for respectively accessing unit weight data and unit value data pertaining to said selected denomination from said memory means;

wherein said pushbutton key means further comprises ten digit key means of a keypad operable for jointly identifying a selected coin denomination and a coin setting key means for jointly identifying a selected coin denomination, jointly selected by said key means of said keypad, and for accessing unit weight data and unit value data pertaining thereto from said memory means;

an arithmetic means for counting a total value of said coins from the weight data given from said weighing scale means and the unit weight data and unit value data given from said memory means;

a display means for displaying the result of said count;

a comparison means for comparing said result with said preestimated total sum range; and a check means for displaying the result from said comparison.

12. A coin counter characterized in being provided with:

a weighing scale means for weighing coins and providing weight data;

a memory means for storing therein unit weight data and unit value data for a plurality of coin denominations;

a read means for reading out said unit weight data and unit value data corresponding to one of said plurality of coin denominations from said memory means, comprising selecting means for selecting data corresponding to one of said plurality of coin denominations;

said selecting means comprising pushbutton key means including a plurality of dedicated single key means each operable for respectively identifying a selected coin denomination and for respectively accessing unit weight data and unit value data pertaining to said selected denomination from said memory means;

wherein said pushbutton key means further comprises ten digit key means of a keypad operable for jointly identifying a selected coin denomination and a coin setting key means for jointly identifying a selected coin denomination, jointly selected by said key means of said keypad, and for accessing unit weight data and unit value data pertaining thereto from said memory means;

a first control means comprising an arithmetic means for counting a total value of said coins from the weight data given from said weighing scale means and the unit weight data and unit value data given from said memory means;

a second control means comprising a range setting means comprising a ten key pad, means for setting an upper limit and means for setting a lower limit for storing a preestimated total sum range in said memory means, and comparison means for comparing the upper and lower limits set by said upper and lower setting means with the total sum;

a display means for displaying the results of said count by said first control means and the range set by said second control means; and a check means for displaying the result of the comparison by said comparison means.

* * * * *